United States Patent
Uhr et al.

(10) Patent No.: US 10,491,396 B2
(45) Date of Patent: Nov. 26, 2019

(54) METHOD AND SERVER FOR PROVIDING NOTARY SERVICE FOR FILE AND VERIFYING FILE RECORDED BY NOTARY SERVICE

(71) Applicant: Coinplug, Inc., Seongnam-si (KR)

(72) Inventors: Joon Sun Uhr, Seongnam-si (KR); Jay Wu Hong, Seoul (KR); Joo Han Song, Seongnam-si (KR)

(73) Assignee: COINPLUG, INC., Seongnam-si (KR)

( * ) Notice: Subject to any disclaimer, the term of this patent is extended or adjusted under 35 U.S.C. 154(b) by 0 days.

(21) Appl. No.: 16/049,379

(22) Filed: Jul. 30, 2018

(65) Prior Publication Data

US 2018/0337787 A1 Nov. 22, 2018

Related U.S. Application Data

(63) Continuation of application No. PCT/KR2017/001072, filed on Feb. 1, 2017.

(30) Foreign Application Priority Data

Feb. 2, 2016 (KR) .......................... 10-2016-0012763

(51) Int. Cl.
*H04L 9/32* (2006.01)
*G06F 21/62* (2013.01)
(Continued)

(52) U.S. Cl.
CPC ............ *H04L 9/3242* (2013.01); *G06F 21/62* (2013.01); *G06F 21/645* (2013.01); *G06Q 20/02* (2013.01);
(Continued)

(58) Field of Classification Search
CPC ........... H04N 7/16; G06F 12/14; G06F 15/16; G06F 13/4068; G06F 13/28; G06F 21/57;
(Continued)

(56) References Cited

U.S. PATENT DOCUMENTS

| 8,510,566 | B1 | 8/2013 | Oprea | |
|---|---|---|---|---|
| 9,270,758 | B2* | 2/2016 | Shanmugam | ............ H04L 67/12 |
| 9,721,071 | B2* | 8/2017 | Chan | ........................ G06F 21/10 |
| 2007/0186271 | A1* | 8/2007 | Ryu | ........................ G11B 27/10 |
| | | | | 725/135 |

(Continued)

FOREIGN PATENT DOCUMENTS

| JP | 2000-250408 | 9/2000 |
|---|---|---|
| JP | 10-2002-0093680 | 12/2002 |

(Continued)

OTHER PUBLICATIONS

English translation of International Search Report dated May 4, 2017 in PCT/KR2017/001072.

(Continued)

*Primary Examiner* — Thanhnga B Truong
(74) *Attorney, Agent, or Firm* — Xsensus, LLP

(57) ABSTRACT

A method is provided for providing a notary service for a file, the method includes the steps in which: (a) when a notary service request for a specific file is obtained, a server generates, by using a hash function, or supports the generation of, a message digest of the specific file; and (b) if a predetermined condition is satisfied, the server registers, in a database, or supports the registration of, a representative hash value or a value obtained by processing the representative hash value, the representative hash value being generated by calculating at least one neighboring hash value that matches a specific hash value, wherein the specific hash value is a hash value of the result of encrypting the message digest with a private key of a first user, a private key of a second user and a private key of the server.

13 Claims, 8 Drawing Sheets

(51) Int. Cl.
*H04L 29/06* (2006.01)
*G06F 21/64* (2013.01)
*G06Q 20/02* (2012.01)
*G06Q 20/06* (2012.01)

(52) U.S. Cl.
CPC ......... *G06Q 20/065* (2013.01); *H04L 9/3236* (2013.01); *H04L 9/3247* (2013.01); *H04L 63/10* (2013.01); *H04L 63/045* (2013.01); *H04L 63/0823* (2013.01); *H04L 2209/30* (2013.01); *H04L 2209/38* (2013.01)

(58) Field of Classification Search
CPC ........ G06F 21/85; G06F 21/62; G06F 21/645; H04L 9/32; H04L 9/065; H04L 63/0464; H04L 69/22; H04L 9/3236; H04L 9/3247; H04L 63/10; H04L 9/3242; H04W 12/02; G06Q 20/02; G06Q 20/065
USPC .................. 725/135, 81; 713/176, 168, 180; 348/E7.061; 380/28, 30
See application file for complete search history.

(56) References Cited

U.S. PATENT DOCUMENTS

2015/0324789 A1 11/2015 Dvorak et al.
2016/0342994 A1* 11/2016 Davis .................. G06Q 20/027

FOREIGN PATENT DOCUMENTS

JP 2014-042214 3/2014
KR 10-2012-0116898 10/2012
WO 2014-127904 8/2014

OTHER PUBLICATIONS

Blaise Gassend et al: "Caches and Merkle Trees for Efficient Memory Authentication", Jul. 20, 2002 (Jul. 20, 2002), XP055132169, Retrieved from the Internet: URL:http://publications.csail.mit.edu/lcs/pubs/pdf/MIT-LCS-TR-857.pdf [retrieved on Jul. 29, 2014]. pp. 1-14.
Extended European Search Report issued Oct. 12, 2018 in European Application No. 17747715.5-1218.

* cited by examiner

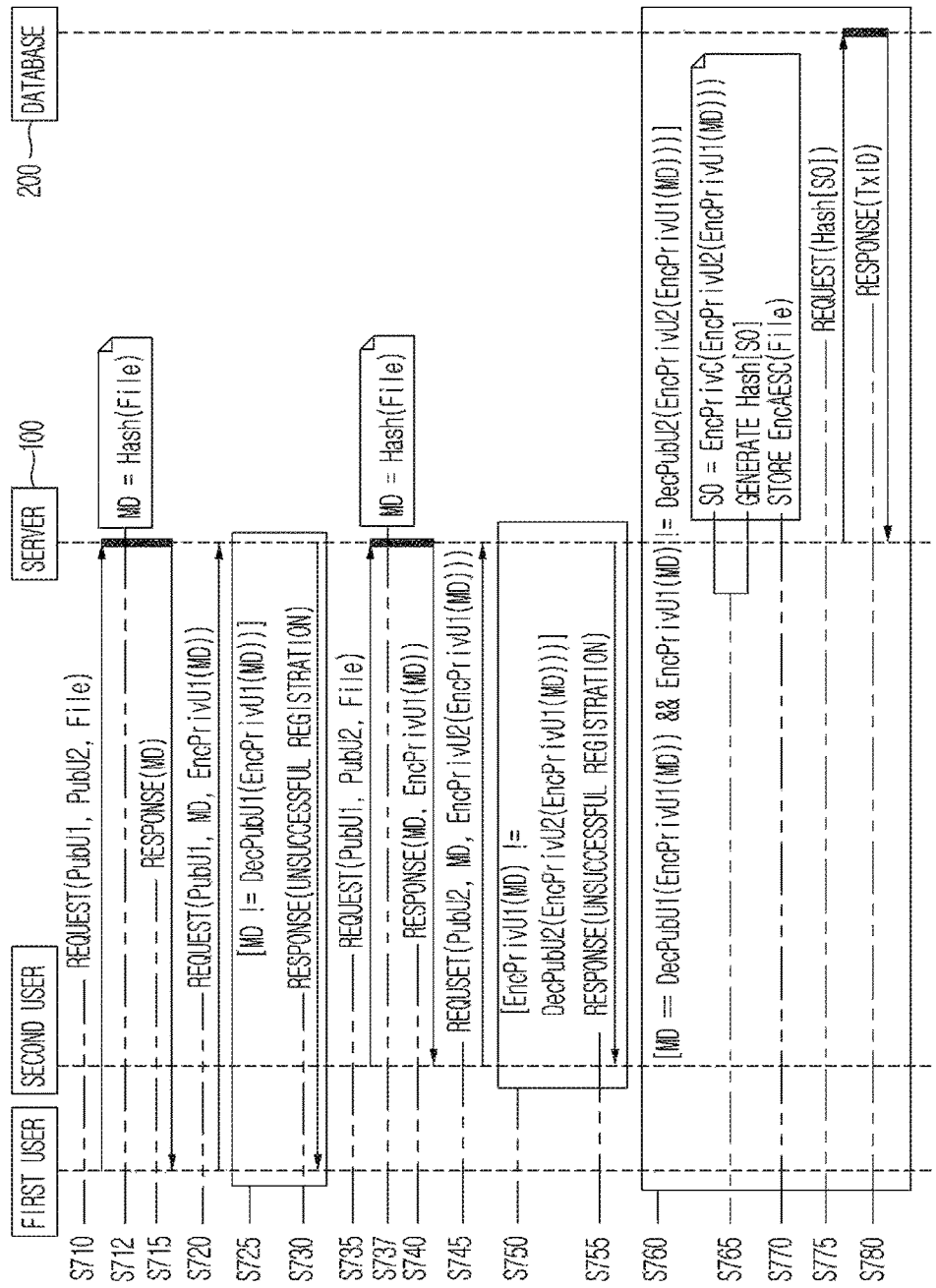

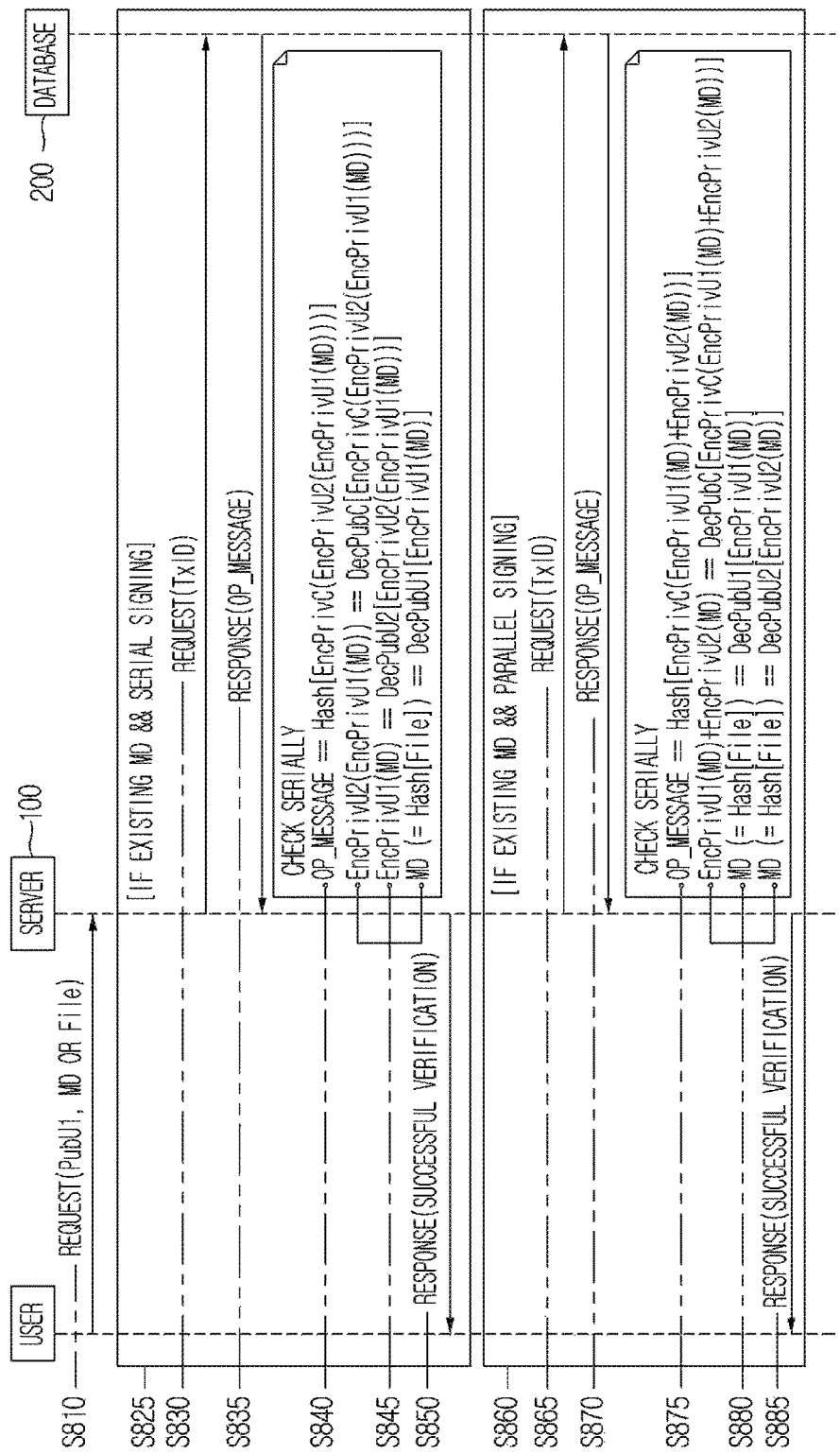

METHOD AND SERVER FOR PROVIDING NOTARY SERVICE FOR FILE AND VERIFYING FILE RECORDED BY NOTARY SERVICE

CROSS-REFERENCE TO RELATED APPLICATIONS

This application is a continuation of International Patent Application No. PCT/KR2017/001072, filed Feb. 1, 2017, claiming priority to Korean Patent Application No. 10-2016-0012763, filed Feb. 2, 2016, both of which are herein incorporated by reference in their entirety.

FIELD OF THE INVENTION

The present invention relates to a method for providing a notary service for a file and verifying the file recorded by the notary service; and more particularly, to the method for providing the notary service for the file and verifying the file recorded by using the notary service, including a "notary process" of, if a notary service request for the file is acquired, generating or supporting another device to generate a specific message digest of the file by using a hash function, and, if one of anchoring conditions is satisfied, registering or supporting another device to register a first representative hash value or its processed value in a database, wherein the representative hash value is generated by using a specific hash value and its corresponding at least one neighboring hash value, and wherein the specific hash value is a hash value of a result acquired by encoding the specific message digest with a private key of a specific user and a private key of a server, and a "verification process" of, if a verification request for the file is acquired, and if a second representative hash value or its processed value, generated by using input data included in the verification request, corresponds to the first representative hash value or its processed value registered in the database, determining or supporting another device to determine that verification of the file is completed, and the server using the same.

BACKGROUND OF THE INVENTION

Authentication is an act of publicly certifying the existence or the contents of a specific fact or specific legal relations. When the authentication of the specific legal relations is requested, an authentication officer generally writes, signs and seals, and stores a document in an authentication office.

However, there are constraints of time and space, and a possibility of missing, forging, and falsifying an authenticated document in a conventional authentication method because a client physically visits the authentication office with a document to be authenticated and its certificate is stored in the authentication office.

Herein, the inventor of the present invention developed an authentication system for a file to perform the authentication in real-time without a possibility of forgery and falsification and without constraints of space by recording authentication information in a blockchain of virtual currency and filed a patent application, Korean Patent Application No. 2015-0188978.

However, there are disadvantages such as a bottleneck in providing the service caused by the increased number of transactions since the authentication system for the file using the blockchain generates an OP message for every file and records it in the blockchain, and high costs for a service management because the transaction fee must be paid every time.

Accordingly, there is a need for a technical solution that can compensate for the disadvantages, thereby guaranteeing a fast service and reducing the costs while taking the advantage of the authentication system for the file to perform the authentication in real-time without the possibility of forgery and falsification and without constraints of space.

SUMMARY OF THE INVENTION

It is an object of the present invention to solve all the aforementioned problems.

It is another object of the present invention to guarantee fast service speed and reduce a transaction cost, when providing a notary service for a file to perform authentication and verification in real-time by recording authentication information in a blockchain of virtual currency.

It is still another object of the present invention to improve service speed and reduce the transaction cost, by configuring a Merkle tree using information on the notary service and registering only a root value of the Merkle tree in the blockchain instead of registering all of the information on the notary service in the blockchain.

It is still yet another object of the present invention to provide guaranteed integrity of a database by performing the verification using the Merkle tree generated in response to a verification request for the file.

In accordance with one aspect of the present invention, there is provided a method for providing a notary service for a file, including steps of: (a) a server, if a notary service request for the file is acquired, generating or supporting another device to generate a specific message digest of the file by using a hash function; and (b) the server, if one of anchoring conditions is satisfied, registering or supporting another device to register a representative hash value or its processed value in a database, wherein the representative hash value is generated by using a specific hash value and its corresponding at least one neighboring hash value, and wherein the specific hash value is a hash value of a result acquired by encoding the specific message digest with a private key of a first user, a private key of a second user, and a private key of the server.

In accordance with another aspect of the present invention, there is provided a method for verifying a file recorded by using a notary service, including steps of: (a) a server acquiring or supporting another device to acquire a verification request for the file, on condition that the server has acquired a notary service request for the file, and then has registered a first representative hash value or its processed value in a database, wherein the first representative hash value is generated by using a first specific hash value and its corresponding at least one neighboring hash value under one of anchoring conditions, and wherein the first specific hash value is a hash value of a result acquired by encoding a specific message digest of the file with a private key of a first user, a private key of a second user, and a private key of the server; and (b) the server, if a second representative hash value or its processed value, generated by using input data included in the verification request, corresponds to the first representative hash value or its processed value registered in the database, determining or supporting another device to determine that a verification of the file is completed.

In accordance with still another aspect of the present invention, there is provided a server for providing a notary service for a file, including: a communication part for acquiring or supporting another device to acquire a notary service request; and a processor for (I), if the notary service request for the file is acquired, generating or supporting another device to generate a specific message digest of the file by using a hash function, and (II), if one of anchoring conditions is satisfied, registering or supporting another device to register a representative hash value or its processed value in a database, wherein the representative hash value is generated by using a specific hash value and its corresponding at least one neighboring hash value, and wherein the specific hash value is a hash value of a result acquired by encoding the specific message digest with a private key of a first user, a private key of a second user, and a private key of the server.

In accordance with still yet another aspect of the present invention, there is provided a server for verifying a file recorded by using a notary service, including: a communication part for acquiring or supporting another device to acquire a verification request for the file; and a processor for, on condition that the server has acquired a notary service request for the file, and then has registered a first representative hash value or its processed value in a database, wherein the first representative hash value is generated by using a first specific hash value and its corresponding at least one neighboring hash value under one of anchoring conditions, and wherein the first specific hash value is a hash value of a result acquired by encoding a specific message digest of the file with a private key of a first user, a private key of a second user, and a private key of the server, if the verification request is acquired, and if a second representative hash value or its processed value, generated by using input data included in the verification request, corresponds to the first representative hash value or its processed value registered in the database, determining or supporting another device to determine that a verification of the file is completed.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art:

FIG. 7 is a sequence diagram illustrating a serial signing process of performing the notary service sequentially in response to notary service requests from multiple users.

FIG. 8 is a sequence diagram illustrating a process of performing verification for the file authenticated with signings of the multiple users.

DETAILED DESCRIPTION OF THE PREFERRED EMBODIMENTS

Figure 1:
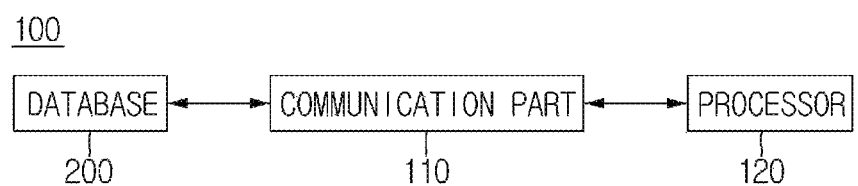
FIG. 1 is a block diagram illustrating a configuration of a server that provides a notary service for a file and verifies the file recorded by using the notary service, in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
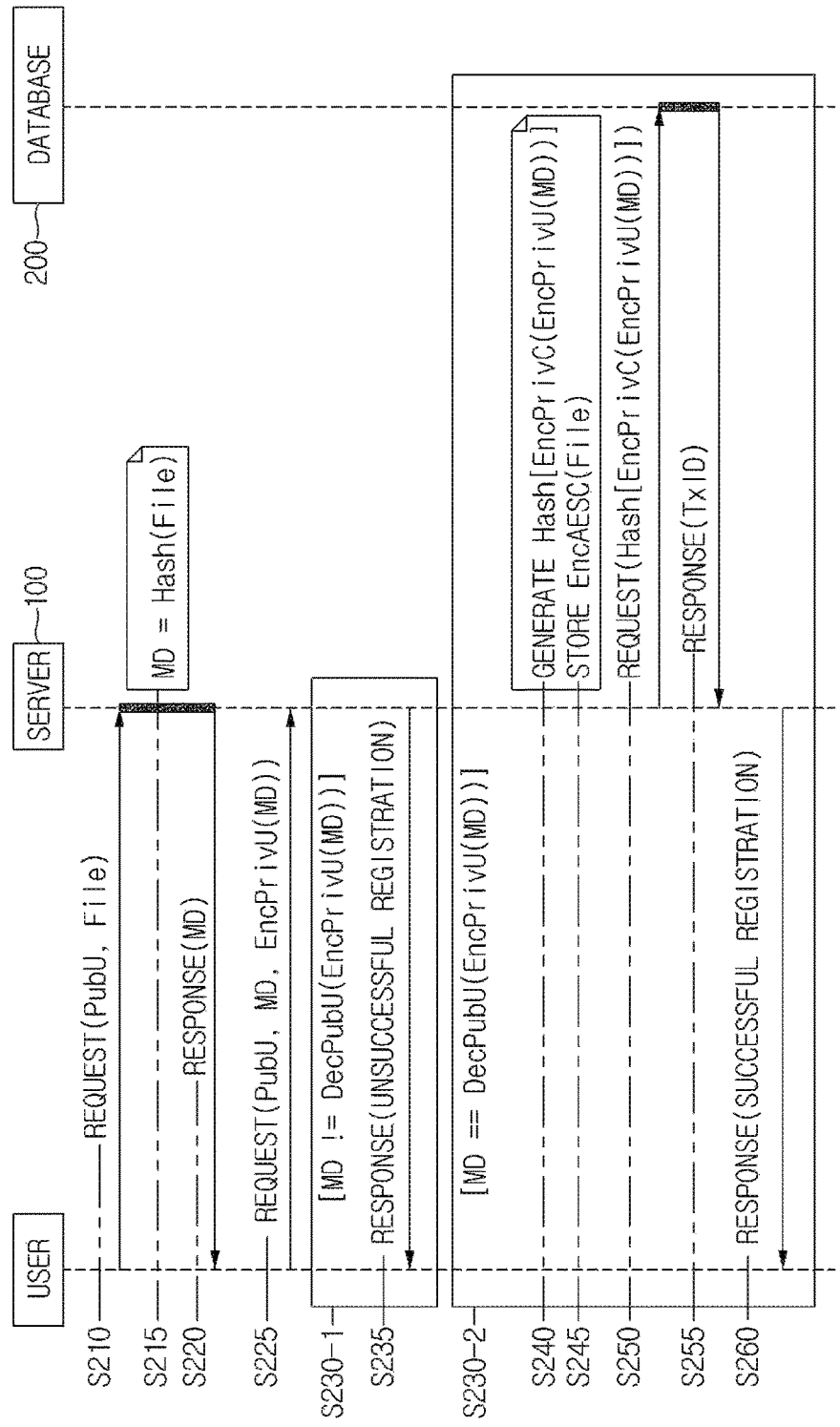
FIG. 2 is a sequence diagram illustrating a process of performing the notary service for the file in response to a request from a single user.

FIG. 1 is a block diagram illustrating a configuration of a server that provides a notary service for a file and verifies the file recorded by using the notary service, in accordance with one example embodiment of the present invention. And FIG. 2 is a sequence diagram illustrating a process of performing the notary service for the file in response to a request from a single user.

Before explaining each of example embodiments, the following are definitions of expressions used in the present specification. On the left of ':' is an expression and on the right is a definition of the expression.

<Definitions of Expressions>
PrivX: Private key of X
PubX: Public key of X
AESX: AES secret key of X
$Enc_{PrivX}(Y)$: Output of encryption of Y using PrivX
$Dec_{PubX}(Y)$: Output of decryption of Y using PubX
$Enc_{AESX}(Y)$: Output of AES encryption of Y using AESX
$Dec_{AESX}(Y)$: Output of AES decryption of Y using AESX
Hash(Y): Hash value of Y First of all, a process of performing the notary service for the file in response to the request from the single user is explained by referring to FIGS. 1 and 2.

By referring to FIG. 1, the server 100 that performs the notary service for the file in accordance with said one example embodiment of the present invention may include a communication part 110 and a processor 120. The server in each example embodiment may be a separate server, but for convenience, it is explained that the service is performed by the single server 100.

The communication part 110 may be configured to transmit and receive data to and from the user or a user device, and a database 200. First, the communication part 110 may acquire or support another device to acquire a notary service request for the file at a step of S210. As illustrated in FIG. 2, if the notary service request for the file is acquired, the file and PubU, which is a public key of the user who requests the notary service, may be acquired. The communication part 110 may respond to the request at a step of S220 where the request and its corresponding response may be performed during one TCP session.

If the notary service request for the file is acquired, the processor 120 may generate or support another device to generate a message digest of the file using a hash function, i.e., MD=Hash(File), at a step of S215. Herein, the hash function may vary in its type. For example, the hash function may be triple sha256. Also, the hash function in the present specification generally means a function to transform the original file, but may include a function that just stores the file without any modification in an extreme case. In this case, the message digest generated by using the hash function may be the same as the file.

The message digest generated in response to the notary service request for the file at the step of S220 may be transmitted to the user who requests the notary service for the file. If the user requests the notary service through the user device, not shown in the diagram, the generated message digest may be transmitted to the user device.

Next, the communication part 110 may acquire EncPrivU (MD), calculated by encoding the message digest with a private key PrivU of the user, from the user at a step of S225. In this case, the message digest and the PubU may also be received from the user because the TCP session may be disconnected after the response of the step S220. For reference, although the present specification is described by using expressions EncPriv(MD) and EncPub(MD) of encoding the message digest with a private key and a public key, the expressions may be replaced with SigPriv(File) and SigPub(File). Additionally, in case that the message digest is generated more than once, expressions SigPriv(MD) and SigPub(MD) may be used.

Further, if the EncPrivU(MD), calculated by encoding the message digest with the PrivU, is acquired, and if the generated message digest B corresponds to information A which is DecPubU(EncPrivU(MD)) acquired by decoding the EncPrivU(MD) with the PubU at a step of S230-2, the processor 120 may generate or support another device to generate a hash value of a first encoded message digest generated by encoding the message digest with the PrivU and a private key PrivC of the server 100 at a step of S240, and may register or support another device to register the generated hash value in the database 200 at a step of S250. The reason for registering the message digest in the form of a hash value in the database 200 is that the size of the data needs to be reduced due to the limits on a storage capacity of the database 200. Herein, the database 200 may be a blockchain of virtual currency. For example, it may be a bitcoin blockchain.

For reference, in the FIG. 2, the expression 'DecPubU (EncPrivU(MD))==MD' is used to represent that the A corresponds to the B, but the expression of the present invention is not limited thereto. For example, 'True==VerPubU(SigPrivU(File))' may also represent the same relationship. Additionally, in case that the message digest is generated more than once, the expression 'True==VerPubU(SigPrivU(MD))' may be used.

Moreover, if the A corresponds to the B, the processor 120 may register or support another device to register Hash [EncPrivC(EncPrivU(MD))] which is the hash value of the first encoded message digest generated by encoding the message digest in sequence with the PrivU and the PrivC, in the database 200. In other words, the hash value of the first encoded message digest may be registered in the database 200 after the user, who is a client, signs the message digest first with the PrivU and then the server 100, which is an authentication officer, signs it with the PrivC. However, the order of signing may be different from this. Especially, if a session between the user and the server 100 is being maintained, the server 100 may sign first and then the user may.

In case that the hash value of the first encoded message digest generated by encoding the message digest with the PrivU and the PrivC is registered in the database 200, the communication part 110 may acquire a transaction ID, i.e., TxID, from the database 200 at a step of S255, wherein the TxID indicates a location of the hash value of the first encoded message digest registered in the database 200.

On the other hand, if the A does not correspond to the B at a step of 230-1, the processor 120 may send a message of unsuccessful registration to the user by reason that the user is not a person related to the file, e.g. a transactor, at a step of S235.

Additionally, if the A corresponds to the B, the processor 120 may store or support another device to store the file at a step of S245. Herein, the file may be encrypted with a symmetric key encryption algorithm such as AES, i.e., Advanced Encryption Standard. In this case, the secret key may be a certain secret key processed from the public key of the user, but the scope of the present invention is not limited thereto.

The processor 120 may store or support another device to store the PubU, the message digest MD, the EncPrivU(MD), and the TxID. Moreover, the processor 120 may further store or support another device to store EncPrivC(EncPrivU (MD)), which is the first encoded message digest generated by encoding the MD in sequence with the PrivU and the PrivC, and its hash value Hash[EncPrivC(EncPrivU(MD))].

If authentication information is registered in the database 200 as stated above, the communication part 110 may send a message of successful registration to the user at a step of S260.

However, in case of the aforementioned example embodiment, there are disadvantages such as a bottleneck in providing the service caused by the increased number of transaction requests because an OP message is generated for every file and recorded in the blockchain, and high costs for a service management because the transaction fee must be paid every time.

Hereinafter, an authentication system is explained that can take advantage of and further complement the authentication system for the file to perform the authentication in real-time without a possibility of forgery and falsification, thereby guaranteeing a fast service and reducing the costs while. Such an authentication system uses a distinct data structure managed by the server 100, unlike the aforementioned example embodiment.

If the notary service request for the file is acquired through the communication part 110, the aforementioned processor 120 may generate or support another device to generate a specific message digest of the file using the hash function. The repeated explanation is omitted as it is similar to the aforementioned example embodiment. Herein, the notary service for the file may be an authentication service for the file or a revocation service for the file, unlike the aforementioned example embodiment.

Also, if one of anchoring conditions is satisfied, the processor 120 may register or support another device to register a representative hash value or its processed value in a database, wherein the representative hash value is generated by using a specific hash value and its corresponding at least one neighboring hash value, and wherein the specific hash value is a hash value of a result acquired by encoding the specific message digest with a private key of a specific user and the private key of the server 100. In other words, the processor 120, if said one of the anchoring conditions is satisfied, may generate or support another device to generate the representative hash value or its processed value by calculating the hash value of the result and its corresponding at least one neighboring hash value, acquired by encoding the specific message digest with the private key PrivU of the specific user and the private key PrivC of the server 100, and register or support another device to register the generated representative hash value or its processed value in the database, instead of registering the hash value of the result of encoding the specific message digest with the PrivU and the PrivC as stated above at the step of S240. Herein, the database may not be managed by the server 100 like the aforementioned database 200, e.g. the blockchain of the virtual currency, but may also be managed by the server 100. The explanation in the present specification is focused on the database 200 which is not managed by the server 100, but the technical idea of the present invention may be applied to the database managed by the server 100.

The calculation of the specific hash value and its corresponding at least one neighboring hash value may be performed by various functions. Assuming the specific hash value to be input and the neighboring hash values to be x1, x2, ..., and xn, the representative hash value t may be expressed as the following equation.

$$t=\text{hash}(\text{function}(\text{input}, x1, x2, \ldots, xn)) \qquad \text{<Equation>}$$

Herein, the server 100 may store or support another device to store the specific hash value and its corresponding at least one neighboring hash value in a certain form of a data structure and manage them. In this regard, the data structure may vary, and one example thereof may be a structure of a Merkle tree. In this case, the calculation of the specific hash value and its corresponding at least one neighboring hash value may be performed by using the Merkle tree.

In other words, the processor 120 may generate or support another device to generate at least one Merkle tree including a specific leaf node where the specific hash value is allocated, and if said one of the anchoring conditions is satisfied, may register or support another device to register the representative hash value or its processed value, which is calculated from the specific hash value and at least one hash value allocated to at least one of other leaf nodes which have same depth as the specific leaf node in the Merkle tree, in the database 200.

More specifically, (x1) the processor 120 may calculate or support another device to calculate (i) the specific hash value and (ii) a hash value allocated to a sibling node of the specific leaf node where the specific hash value is allocated, to thereby acquire a resultant value, and then allocate or support another device to allocate a hash value of the resultant value to a parent node of the specific leaf node. (x2) If the parent node is a root node of the Merkle tree, the hash value of the resultant value allocated to the parent node may be regarded as the representative hash value. (x3) On the other hand, if the parent node is not the root node of the Merkle tree, the processor 120 may repeat or support another device to repeat the steps of (x1) to (x3) by using the hash value allocated to the parent node as the specific hash value.

Additionally, the processor 120 may register or support another device to register the hash value ultimately allocated to the root node of the Merkle tree in the database 200 as the representative hash value. Herein, the processed value of the representative hash value may be registered. For example, a value resulting from hex operation on the representative hash value may be registered.

A first data structure and a second data structure may be linked in a form of a chain if the server 100 stores the specific hash value and the at least one neighboring hash value in the first data structure and then stores and manages the second data structure in an identical form with the first data structure.

Especially, as stated above, if the first data structure and the second data structure are Merkle trees, a root value of the first data structure or a hash value of the root value may be allocated to a first leaf node of the second data structure.

Moreover, data integrity may be further ensured by verifying the first data structure when the second data structure is generated. Verification of the second data structure will be explained later.

Further, in case of a first Merkle tree among two or more Merkle trees linked in a form of a chain, a hash value of certain message data or its processed value comprised of text, number or symbol may be allocated to a first leaf node of the first Merkle tree. For example, a hash value of a first input message given by the server 100 at the time of generation of the Merkle tree may be allocated.

Figure 3:
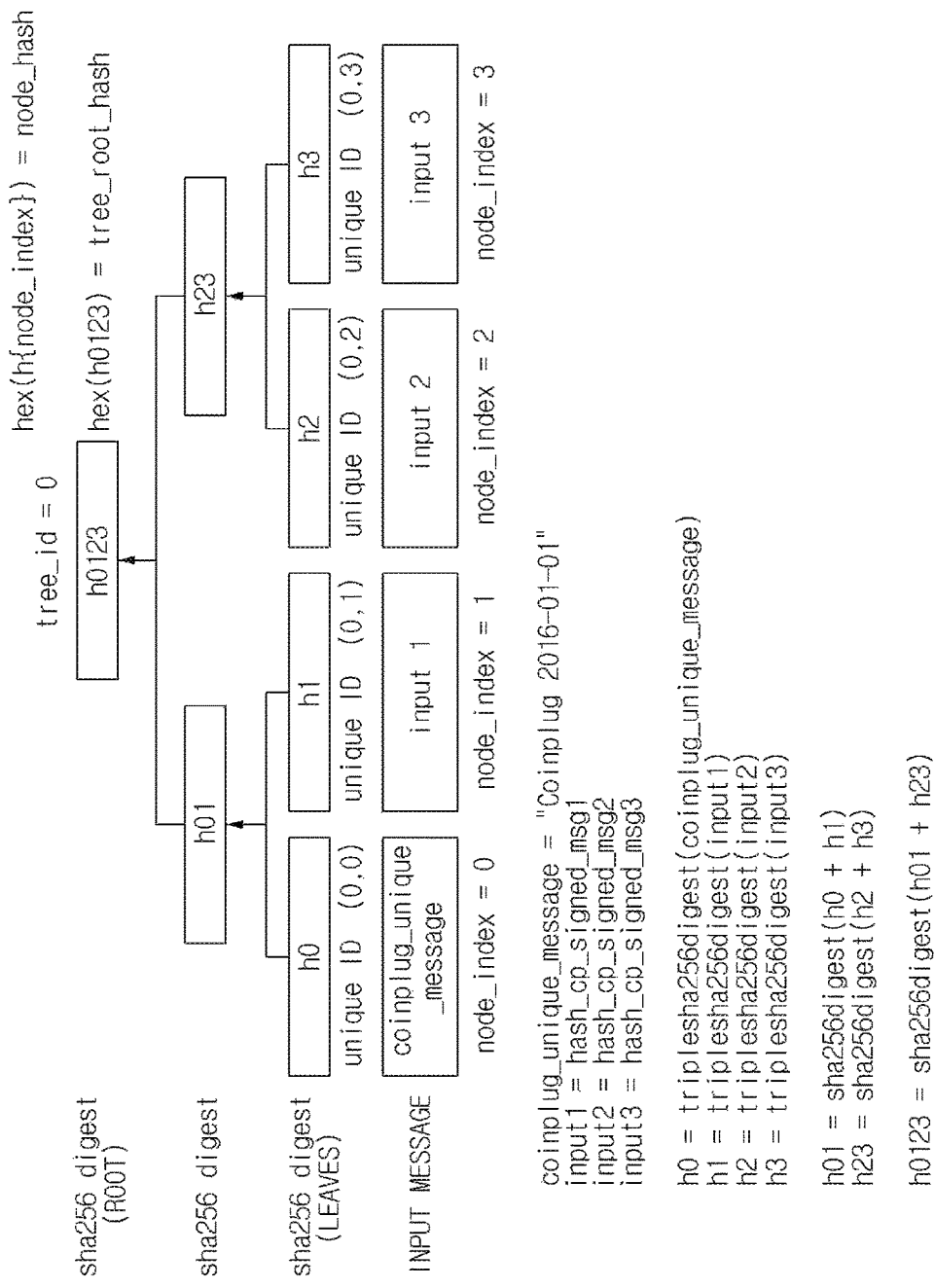
FIGS. 3 and 4 are diagrams illustrating examples of Merkle trees generated in accordance with one example embodiment of the present invention.
Figure 4:
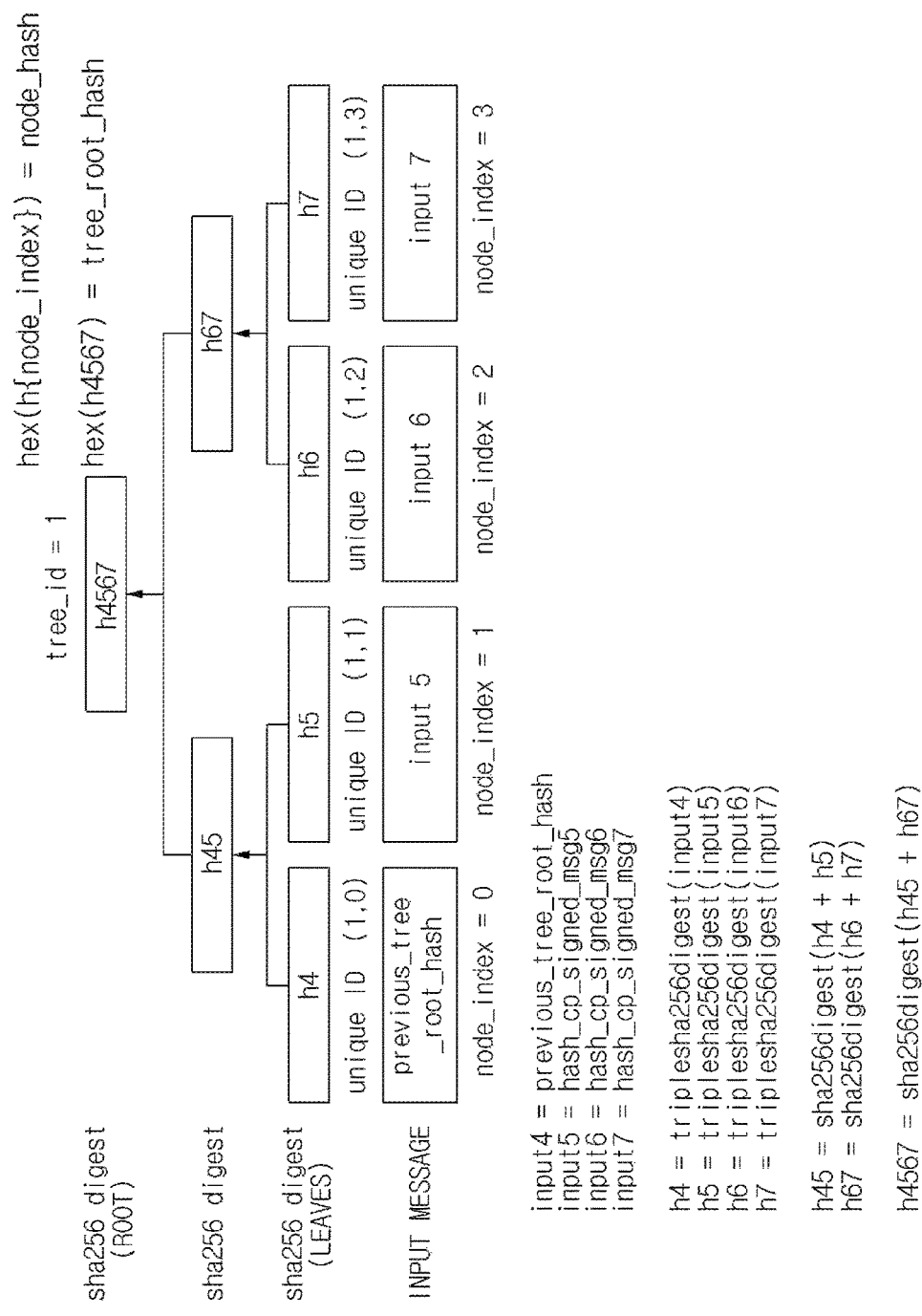

FIGS. 3 and 4 are diagrams illustrating examples of the Merkle trees generated in accordance with said one example embodiment of the present invention.

FIG. 3 illustrates a Merkle tree with four ($2^2$) leaf nodes. As the illustrated Merkle tree is the first Merkle tree whose tree_id is zero, the hash value triplesha256digest(coinplug_unique_message) of the certain message data "Coinplug 2016-01-01" is allocated to a node h0 which is the first leaf node. In case that the notary service request for the file is acquired, the processor 120 may generate or support another device to generate a leaf node next to the last leaf node of the currently configured Merkle tree and allocate or support another device to allocate the specific hash value or its processed value to the generated leaf node. For example, if allocation is completed up to a node h1, which is a second leaf node of the Merkle tree in FIG. 3, at a previous step, a node h2 which is a next leaf node may be generated and the specific hash value or its processed value triplesha256digest (input2) may be allocated to the node h2. Further, the processor 120 may calculate or support another device to calculate (i) the specific hash value and (ii) a hash value allocated to a sibling node h3 of the node h2, which is a third leaf node where the specific hash value is allocated to, to thereby acquire a resultant value. A hash value of the resultant value may be allocated to a parent node h23 of the node h2 and the node h3. As the parent node h23 is not the root node of the Merkle tree, the processor 110 may repeat or support another device to repeat the above process by using the hash value allocated to the node h23 as the specific hash value. In other words, the hash value allocated to the node h23 and a hash value allocated to a node h01 may be used to generate a calculated value which is allocated to a node h0123, i.e., a parent node of the node h23 and the node h01. Herein, as the node h0123 is the root node of the Merkle tree, the processor 120 may register or support another device to register a processed value hex(h{node_index}) of the hash value allocated to the node h0123 in the database 200.

Meanwhile, the aforementioned anchoring conditions may include at least one of (i) acquisition of a certain number of message digests including the specific message digest in response to respective notary service requests, (ii) a certain time lapse, (iii) generation of a block in a blockchain, and (iv) one or more characteristics of the user who requests the notary service.

For example, if the message digests are acquired as much as the number of leaf nodes of the Merkle tree in response to the respective notary service requests, a hash value of a result acquired by encoding each of the message digests with the private key of each user and the private key of the server 100 may be input of the Merkle tree, that is, values allocated to the leaf nodes.

Also, the processor 120 may generate or support another device to generate a root value of the Merkle tree by the certain time as the condition (ii) above. In this case, if the certain time is elapsed, the processor 120 may generate or support another device to generate the Merkle tree using the input of the certain time and may register or support another device to register the root value of the Merkle tree in the database 200.

However, in this case, there may be no value allocated to the sibling node of the specific leaf node where the specific hash value is allocated despite the certain time lapse. In case that no hash value is allocated to the sibling node of the specific leaf node despite the certain time lapse, the processor 120 may allocate or support another device to allocate a certain hash value to the sibling node to thereby produce the root value of the Merkle tree in the aforementioned way. For example, the processor 120 may copy and allocate the specific hash value to the sibling node.

The characteristics of the user who requests the notary service may be at least part of information on cost paid by the user who requests the notary service, information on a time-zone during which the notary service is performed, information on location where the notary service is performed, and information on a type of the user who requests the notary service. But the scope of the present invention is not limited thereto.

Meanwhile, if generation of a new Merkle tree starts and if said one of the anchoring conditions is satisfied without any notary service request, the processor 120 may generate or support another device to generate the new Merkle tree with first and second leaf nodes where certain message data is respectively allocated, and may register or support another device to register a root value or its processed value of the new Merkle tree in the database 200. In this case, the Merkle tree may be generated with two leaf nodes.

However, if the server 100 stores the specific hash value and the at least one neighboring hash value in the first data structure and then stores and manages the second data structure in an identical form with the first data structure as aforementioned, the first data structure and the second data structure may be linked in a form of a chain. Especially, if the first data structure and the second data structure are the Merkle trees, the root value of the first data structure or a hash value of the root value may be allocated to the first leaf node of the second data structure.

FIG. 4 is a diagram illustrating an example of a new Merkle tree generated as the second data structure in accordance with said one example embodiment of the present invention.

By referring to FIG. 4, it is clear that the root value hex(h0123) of the Merkle tree whose tree_id is zero in FIG. 3 is allocated to a node h4, which is a first leaf of the new Merkle tree, as triplesha256digest(input4). In such a manner, tracking becomes easier even in the case of data forgery and, therefore the present invention has an advantage of improving the data integrity, by linking multiple data structures created when a transaction occurs.

Next, a process for verifying a file in response to a request from a single user is explained.

Verification in the present specification may be requested by the transactor or a third party, and may be sorted into a case using the distinct data structure managed by the server 100 and a case without using the distinct data structure. Both terms of "audit" and "verification" may be used. First of all, the verification performed without using the distinct data structure managed by the server 100 is explained.

The file may be verified by a separate device which may refer to information on the aforementioned server 100, or by the aforementioned server 100. Hereinafter, the explanation is based on the verification of the file by the aforementioned server 100 for convenience.

Figure 5:
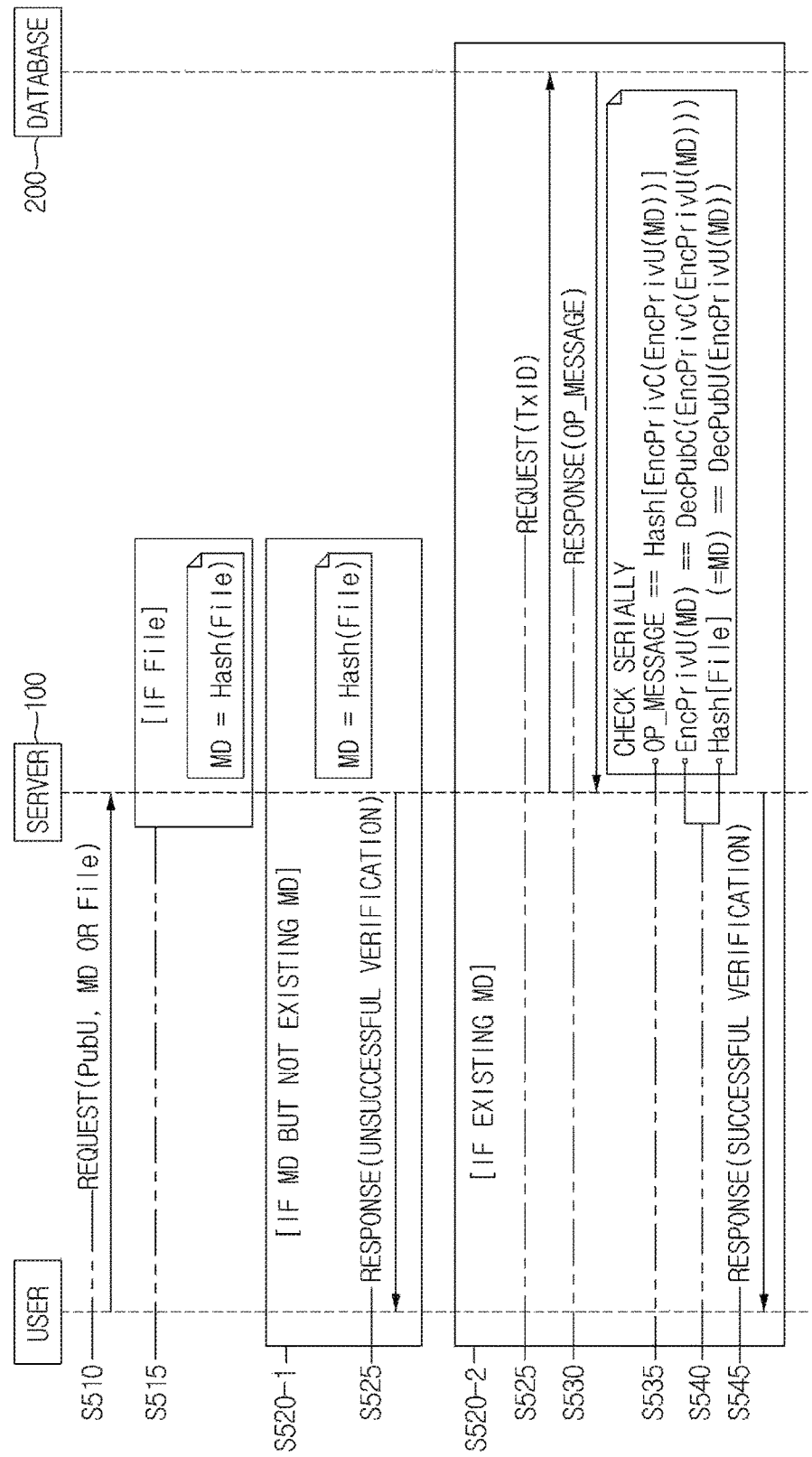
FIG. 5 is a sequence diagram illustrating a process of performing a verification service for the file in response to a request from a single user.

FIG. 5 is a sequence diagram illustrating a process of performing a verification service for the file in response to the request from the single user.

By referring to FIG. 5, similarly to the aforementioned example, the communication part 110 may acquire a verification request for the file at a step of S510. As illustrated in FIG. 5, if the verification request for the file is acquired, the file and the PubU, which is the public key of the user who requests the verification, may be acquired. The communication part 110 may respond to the request, and the request and its corresponding response may be performed within one TCP session.

As stated above, on condition that the server 100 has determined the user, who requested the notary service of the file, as related to the file in response to the notary service request for the file and, as a result, that the server 100 has stored the hash value of the first encoded message digest, generated by encoding the message digest of the file with the PrivU and the PrivC, in the database 200, and has been managing its corresponding transaction ID, if the verification request for the file is acquired, the processor 120 may acquire or support another device to acquire the transaction ID corresponding to at least one of the PubU and the message digest of the file. In this case, the transaction ID, i.e., TxID, may have been stored in the server 100 or in a device which the server 100 may refer to.

In case that the communication part 110 receives the verification request for the file at the step of S510, if the file is acquired for the verification, the processor 120 may generate or support another device to generate an original message digest of the file using the hash function, i.e., MD=Hash(File), at a step of S515. In this case, the processor 120 may refer to the transaction ID corresponding to at least one of the PubU and the generated original message digest of the file.

If no information corresponding to the original message digest is found despite the verification request at a step of S520-1, the communication part 110 may send a message of unsuccessful verification to the user at a step of S525.

Also, if the information, which is the transaction ID corresponding to the original message digest, is found at a step of S520-2, the communication part 110 may send a query to the database 200 using the TxID at a step of S525 and acquire an OP message including the hash value of the first encoded message digest generated by encoding the message digest with the PrivU and the PrivC from the database 200 at a step of S530.

Further, if a hash value of a second encoded message digest, generated by encoding the original message digest with the PrivC and the PrivU, corresponds to the hash value of the first encoded message digest in the OP message, then the processor 120 may determine or support another device to determine the file as verified at a step of S535.

Herein, the second encoded message digest generated by encoding the original message digest with the PrivC and the PrivU may be EncPrivC(EncPrivU(MD)) which is generated by encoding the original message digest in sequence with the PrivU and the PrivC.

However, even in case that the hash value of X, which is the second encoded message digest, corresponds to the hash value of the first encoded message digest in the OP message, if a result value DecPubU(DecPubC(EncPrivC(EncPrivU (MD)))), acquired by decoding the X with a public key PubC of the server 100 and the PubU, corresponds to the message digest of the file, the processor 120 may further determine or support another device to determine the file as verified at a step of S540. In other words, the verification of the file may be completed with two more steps. This is because there may be a possibility of changes in the private key, the public key, etc. of the user.

The three steps of the verification above may be represented as the expressions below.

$$OP\_MESSAGE==Hash[Enc_{PrivC}(Enc_{PrivU}(MD))]$$

$$Enc_{PrivU}(MD)==Dec_{PubC}[Enc_{PrivC}(Enc_{PrivU}(MD))]$$

$$MD(=Hash[File])==Dec_{PubU}[Enc_{PrivU}(MD)] \quad \text{<Expression 1>}$$

If the verification of the file is successful, the communication part 110 may send a message of successful verification to the user at a step of S545.

Also, if the file is determined as verified, the processor 120 may allow a download of the file. In this case, the user may download the file through the user device, etc.

Next, the verification performed by using the distinct data structure managed by the server 100 is explained.

First of all, as stated above, on condition that the server 100 has acquired the notary service request for the file, and then has registered the aforementioned representative hash value, referred to here for convenience as a first representative hash value, or its processed value in the database 200, wherein the first representative hash value is generated by using the aforementioned specific hash value, referred to here for convenience as a first specific hash value, and its corresponding at least one neighboring hash value under said one of the anchoring conditions, and wherein the first specific hash value is the hash value of the result acquired by encoding the specific message digest of the file with the private key of the specific user and the private key of the server 100, if a verification request for the file is acquired, and if a second representative hash value or its processed value, generated by using input data included in the verification request, corresponds to the first representative hash value or its processed value registered in the database 200, then the processor 120 may determine or support another device to determine that the verification of the file is completed.

In this regard, the second representative hash value may be generated by calculating a second specific hash value and its corresponding at least one neighboring hash value, wherein the second specific hash value is a hash value of a result acquired by encoding the specific message digest of the file extracted from the input data included in the verification request with the private key of the specific user and the private key of the server.

Herein, the input data included in the verification request may have at least one of (i) the file, (ii) the specific message digest of the file, or (iii) an ID issued during the notary service for the file.

If the input data includes the file, the specific message digest of the file may be generated by the aforementioned method, and the second specific hash value may be generated based thereon. Further, the second representative hash value may be generated by calculating the second specific hash value and its corresponding at least one neighboring hash value.

If the input data includes the ID issued during the notary service, the second specific hash value may be set to a value allocated to a leaf node corresponding to the ID in the previously generated Merkle tree. In the examples illustrated in FIGS. 3 and 4, the ID may be a unique ID.

The same explanation for the first specific hash value aforementioned may be applied to the second specific hash value. That is, the calculation of the second specific hash value and its corresponding at least one neighboring hash value may be performed by various functions. Thus the explanation thereof is omitted by referring to the above.

In this case, the calculation of the second specific hash value and its corresponding at least one neighboring hash value may be performed by using a Merkle tree. If the verification request is acquired, the processor 120 may identify or support another device to identify information on the Merkle tree related to the input data and on its leaf nodes.

Further, the second representative hash value may be calculated by using the second specific hash value allocated to a specific leaf node of the Merkle tree, and a hash value allocated to at least one of other leaf nodes which have same depth as the specific leaf node in the Merkle tree.

In case that the service is performed by using the database not managed by the server 100, e.g. the blockchain of the virtual currency, the processor 120 may refer or support another device to refer to a certain transaction ID corresponding to the information on the identified Merkle tree.

In this case, if the verification request for the file is acquired, the processor 120 may refer or support another device to refer to the certain transaction ID, and acquire or support another device to acquire an OP message from the database 200 by referring to the certain transaction ID. Also, if the second representative hash value or its processed value, generated by using the input data included in the verification request, corresponds to the first representative hash value or its processed value included in the OP message, the verification of the file may be determined as completed.

Meanwhile, the certain transaction ID may be provided as included in the input data. In other words, in response to the verification request, the user may transmit or support another device to transmit the certain transaction ID to the server 100 in addition to at least one of (i) the file, (ii) the specific message digest of the file, or (iii) the ID issued during the notary service for the file.

In a calculation process of the verification, the processor 120 may generate or support another device to generate a new Merkle tree. In this process, the Merkle tree generated during the aforementioned notary service may be used. In other words, (x1) the processor 120 may calculate or support another device to calculate (i) the second specific hash value and (ii) a hash value allocated to a sibling node of the specific leaf node where the second specific hash value is allocated in the previously generated Merkle tree, to thereby acquire a resultant value, and then allocate or support another device to allocate a hash value of the resultant value to a parent node of the specific leaf node in the new Merkle tree. Further, (x2) if the parent node is a root node of the new Merkle tree, the processor 120 may compare or support another device to compare the hash value allocated to the parent node, as the second representative hash value, with the first representative hash value or its processed value included in the OP message, and (x3) if the parent node is not the root node of the Merkle tree, repeat or support another device to repeat the steps of (x1) to (x3) by using the hash value allocated to the parent node as the second specific hash value.

The processor 120, if the root value or its processed value ultimately generated in the Merkle tree corresponds to the first representative hash value or its processed value in the OP message, may determine or support another device to determine that the verification of the file is completed.

In the present invention, if a Merkle tree with $n^m(=N)$ leaf nodes is generated during the notary service, integrity of the transaction may be confirmed quickly as the verification of the file is possible by calculating only as much as the height of the Merkle tree, i.e., $\log_n N=m$.

On the other hand, if the input data is acquired, the processor 120 may identify or support another device to identify at least part of the information on the Merkle tree related to the input data and on its leaf nodes, by referring to time information related to the input data.

Hereinafter, the verification process is explained by taking an example illustrated in FIG. 3.

By referring to FIG. 3 again, if verification of input 2 is requested, the processor 120 may identify or support another device to identify the information on the previously generated Merkle tree and on its leaf nodes by referring to the information on the input data, and acquire or support another device to acquire the OP message from the database 200 by transmitting the certain transaction ID corresponding to the information on the identified Merkle tree whose tree_id is zero to the database 200. Then, the processor 120 may generate or support another device to generate the new Merkle tree by using the input 2. As a hash value of the input 2, i.e., triplesha256digest(input2), is allocated to the node h2, the processor 120 may calculate or support another device to calculate the hash value allocated to the node h2 and the hash value allocated to the sibling node h3 of the node 2 in the previously generated Merkle tree, to thereby acquire a resultant value. A hash value of the resultant value may be allocated to the parent node h23 of the node h2 and the node h3. As the node h23 is not the root node of the new Merkle tree, the processor 120 may repeat or support another device to repeat the above process by using the hash value allocated to the node 23 as the second specific hash value. In other words, by using the hash value allocated to the node h23 as the second specific hash value, the hash value allocated to the node h23 and the hash value allocated to the node h01 in the previously generated Merkle tree may be calculated and then allocated to the node h0123 which is the parent node of the node h23 and the node h01. Herein, as the node h0123 is the root node of the Merkle tree, the processor 120 may compare or support another device to compare the processed value hex(h{node_index}) of the hash value allocated to the node h0123 with the first representative hash value or its processed value included in the OP message.

Next, a process for performing the notary service of the file in response to requests from multiple users is explained in accordance with another example embodiment of the present invention. However, the repeated explanation is omitted. Further, the same numerals indicate the same devices in the previous embodiment of the present invention. First of all, an authentication system without using the distinct data structure managed by the server 100 is explained.

Figure 6:
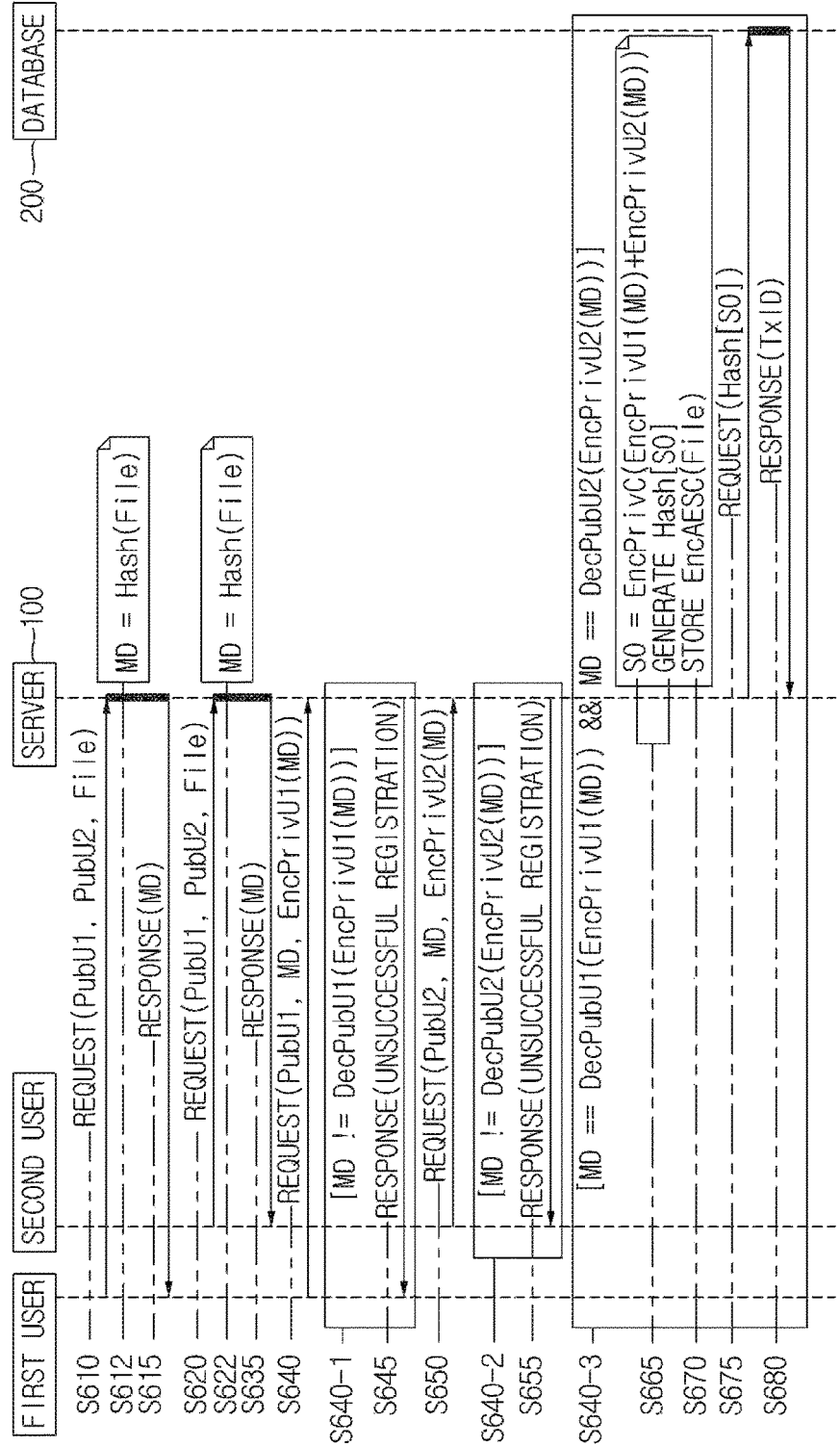
FIG. 6 is a sequence diagram illustrating a parallel signing process of performing in parallel the notary service in response to notary service requests from multiple users.

FIG. 6 represents a parallel signing process of performing the notary services in parallel, and FIG. 7 represents a serial signing process of performing the notary services sequentially, in response to the notary service requests from at least part of the multiple users.

First of all, by referring to FIG. 6, if at least two notary service requests for the file are acquired from at least two of the multiple users at steps of S610 and S620, the processor 120 may generate or support another device to generate the message digest of the file, i.e., MD=Hash(File), using the hash function at each step of S612 and S622. Moreover, if a first message digest generated by encoding the message digest with a private key PrivU1 of a first user and a second message digest generated by encoding the message digest with a private key PrivU2 of a second user are acquired at steps of S640 and S650, and if each piece of (i) information A' which is DecPubU1(EncPrivU1(MD)) acquired by decoding the first message digest with a public key PubU1 of the first user and (ii) information B' which is DecPubU2 (EncPrivU2(MD)) acquired by decoding the second message digest with a public key PubU2 of the second user corresponds to the generated message digest C', which is the MD, at a step of S640-3, then the processor 120 may register or support another device to register a hash value of a third message digest, generated by encoding the MD with the PrivU1, the PrivU2, and the PrivC, in the database 200 at a step of S675.

Next, the communication part 110 may acquire a transaction ID indicating a location of the registered hash value of the third message digest in the database 200 at a step of S680.

Moreover, if each of the A' and the B' corresponds to the C', the processor 120 may register or support another device to register EncPrivC(EncPrivU1(MD)+EncPrivU2(MD)), which is acquired by encoding a data group with the PrivC, in the database 200, wherein the data group is comprised of the first message digest generated by encoding the MD with the PrivU1 and the second message digest generated by encoding the MD with the PrivU2.

Next, by referring to FIG. 7, if the notary service request for the file is acquired at each step of S710 and S735, the processor 120 may generate or support another device to generate the message digest of the file using the hash function, i.e., MD=Hash(File), at each step S712 and S737. In this case, as illustrated in FIG. 7, the PubU1, the PubU2, and the file may be acquired together.

If (i) the first message digest EncPrivU1(MD), generated by encoding the message digest with the PrivU1, is acquired at a step of S720, and information A", which is the DecPubU1(EncPrivU1(MD)) acquired by decoding the first message digest with the PubU1, corresponds to the generated message digest B", which is the MD, and if (ii) EncPrivU2(EncPrivU1(MD)), generated by encoding the message digest with the PrivU1 and the PrivU2, is acquired at a step of S745, and information C" which is DecPubU2 (EncPrivU2(EncPrivU1(MD))) acquired by decoding the EncPrivU2(EncPrivU1(MD)) with the PubU2 corresponds to information D" which is the first message digest EncPrivU1(MD) at a step of S760, then the processor 120 may register or support another device to register the hash value of the third message digest, generated by encoding the message digest with the PrivU1, the PrivU2, and the PrivC, in the database 200 at a step of S775.

Moreover, if the A" corresponds to the B", and if the C" corresponds to the D", the processor 120 may register or support another device to register SO=EncPrivC(EncPrivU2 (EncPrivU1(MD))), which is generated by encoding the message digest in sequence with the PrivU1, the PrivU2, and the PrivC, in the database 200.

Herein, the communication part 110 may acquire the transaction ID, i.e., TxID, indicating a location of the registered hash value of the third message digest in the database 200 at a step of S780.

Next, said another example embodiment of responding to the notary service requests from the multiple users in the authentication system using the distinct data structure managed by the server 100 is further explained.

The processor 120, (i) if the notary service request for the file is acquired, may generate or support another device to generate the specific message digest of the file by using the hash function, and, (ii) if one of the anchoring conditions is satisfied, may register or support another device to register a representative hash value or its processed value in the database 200, wherein the representative hash value is generated by using the specific hash value and its corresponding at least one neighboring hash value, and wherein the specific hash value is a hash value of a result acquired by encoding the specific message digest with the private key of the first user, the private key of the second user, and the private key of the server 100.

Herein, in the parallel signing process, the specific hash value may be a hash value of EncPrivC(EncPrivU1(MD)+EncPrivU2(MD)), which is acquired by encoding a data group with the private key of the server 100, wherein the data group is comprised of a first encoded message digest generated by encoding the specific message digest with the private key of the first user and a second encoded message digest generated by encoding the specific message digest with the private key of the second user.

On the other hand, in the serial signing process, the specific hash value may be a hash value of EncPrivC(EncPrivU2(EncPrivU1(MD))), which is acquired by encoding the specific message digest in sequence with the private key of the first user, the private key of the second user, and the private key of the server 100.

Next, a process for verifying the authenticated file in response to requests from multiple users is explained. First of all, verification performed without using the distinct data structure managed by the server 100 is explained by referring to FIG. 8. However, the repeated explanation is omitted.

FIG. 8 is a sequence diagram illustrating the process for verifying the file authenticated with signings of the multiple users.

For reference, steps of S825 to S850 represent a serial signing process for verifying the file sequentially, and steps of S860 to S885 represent a parallel signing process for verifying the file in parallel, in response to verification requests from at least part of the multiple users. Both the serial signing process and the parallel process can be applied to a service provided by the present invention.

By referring to FIG. 8, as stated above, on condition that the server 100 has determined the first user and the second user as related to the file in response to the notary service requests for the file, and as a result, that the server 100 has stored the hash value of the third message digest, generated by encoding the MD of the file with the PrivU1, the PrivU2, and the PrivC, in the database 200, and that the server 100 has been managing its corresponding transaction ID, i.e., TxID, if at least one of the verification requests for the file is acquired at a step of S810, the processor 120 may acquire the TxID corresponding to at least one of an original message digest of the file, i.e., MD=Hash(File), and the public keys of the users who requests the verification of the file.

Also, the communication part 110 may acquire an OP message, which includes the hash value of the third message digest from the database 200 by referring to the TxID at each step of S835 and S870.

Further, if a hash value of a fourth message digest generated by encoding the original message digest with the PrivC, the PrivU1, and the PrivU2 correspond to the hash value of the third message digest in the OP message, then the processor 120 may determine or support another device to determine the file as verified at each step of S840 and S875.

In the parallel signing process, the processor 120 may determine or support another device to determine the file as verified according to whether Hash[EncPrivC(EncPrivU1(MD)+EncPrivU2(MD))], which is a hash value of a first encoded value acquired by encoding a data group with the PrivC, corresponds to the hash value of the third message digest in the OP message, wherein the data group is comprised of a fifth message digest generated by encoding the original message digest with the PrivU1 and a sixth message digest generated by encoding the original message digest with the PrivU2.

However, even in case that the hash value Hash[EncPrivC(EncPrivU1(MD)+EncPrivU2(MD))] of Y, which is the first encoded value acquired by encoding the data group comprised of the fifth message digest and the sixth message digest with the PrivC, corresponds to the hash value of the third message digest, generated by encoding the message digest with the PrivU1, the PrivU2, and the PrivC, in the OP message, if (i) a first decoded value obtained by decoding the fifth message digest, which is obtained by decoding the Y with the PubC, with the PubU1 corresponds to the MD, and if (ii) a second decoded value obtained by decoding the sixth message digest, which is obtained by decoding the Y with the PubC, with the PubU2 corresponds to the MD, the processor 120 may determine or support another device to determine the file as verified. In other words, the verification of the file may be completed with three more steps.

The four steps of the verification above may be represented as the expressions below.

$$OP\_MESSAGE == Hash[Enc_{PrivC}(Enc_{PrivU1}(MD) + Enc_{PrivU2}(MD)))]$$

$$Enc_{PrivU1}(MD) + Enc_{PrivU2}(MD)) == Dec_{PubC}[Enc_{PrivC}(Enc_{PrivU1}(MD) + Enc_{PrivU2}(MD))]$$

$$MD(=Hash[File]) == Dec_{PubU1}[Enc_{PrivU1}(MD)]$$

$$MD(=Hash[File]) == Dec_{PubU2}[Enc_{PrivU2}(MD)] \quad <\text{Expression 2}>$$

On the other hand, in the serial signing process, the processor 120 may determine or support another device to determine the file as verified according to whether Hash[EncPrivC(EncPrivU2(EncPrivU1(MD)))], which is the hash value of a second encoded value acquired by encoding the original message digest in sequence with the PrivU1, the PrivU2, and the PrivC, corresponds to the hash value of the third message digest in the OP message.

However, even in case that the hash value Hash[EncPrivC(EncPrivU2(EncPrivU1(MD)))] of Z, which is the second encoded value acquired by encoding the original message digest in sequence with the PrivU1, the PrivU2, and the PrivC, corresponds to the hash value of the third message digest in the OP message, if DecPubU1(DecPubU2(DecPubC(EncPrivC(EncPrivU2(EncPrivU1(MD)))))) obtained by decoding the Z in sequence with the PubC, the PubU2, and the PubU1 corresponds to the MD, the processor 120 may determine or support another device to determine the file as verified. In other words, the verification of the file may be completed with three more steps.

The four steps of the verification above may be represented as the expressions below.

$$OP\_MESSAGE = Hash[Enc_{PrivC}(Enc_{PrivU2}(Enc_{PrivU1}(MD)))]$$

$$Enc_{PrivU2}(Enc_{PrivU1}(MD)) = Dec_{PubU2}[Enc_{PrivU2}(Enc_{PrivU1}(Enc_{PrivU1}(MD)))]$$

$$Enc_{PrivU1}(MD) = Dec_{PubU2}[Enc_{PrivU2}(Enc_{PrivU1}(MD))]$$

$$MD(=Hash[File]) = Dec_{PubU1}[Enc_{PrivU1}(MD)] \quad <\text{Expression 3}>$$

Next, said another example embodiment of responding to the verification request in the authentication system using the distinct data structure managed by the server 100 is further explained.

On condition that the server 100 has acquired the authentication request for the file, and then has registered a first representative hash value or its processed value in the database, wherein the first representative hash value is generated by using a first specific hash value and its corresponding at least one neighboring hash value under one of the anchoring conditions, and wherein the first specific hash value is the hash value of the result acquired by encoding the specific message digest of the file with the private key of the first user, the private key of the second user, and the private key of the server, if the verification request for the file is acquired, if a second representative hash value or its processed value, generated by using the input data included in the verification request, corresponds to the first representative hash value or its processed value registered in the database, the processor 120 may determine or support another device to determine that the verification of the file is completed.

Herein, in the parallel signing process, the first specific hash value may be the hash value of EncPrivC(EncPrivU1(MD)+EncPrivU2(MD)), which is acquired by encoding a data group with the private key of the server, wherein the data group is comprised of the first encoded message digest generated by encoding the specific message digest with the private key of the first user and the second encoded message digest generated by encoding the specific message digest with the private key of the second user.

In the serial signing process, the first specific hash value may be the hash value of EncPrivC(EncPrivU2(EncPrivU1(MD))), which is acquired by encoding the specific message digest in sequence with the private key of the first user, the private key of the second user, and the private key of the server.

The present invention has an effect of guaranteeing fast service speed and reducing a transaction cost when providing a notary service for a file to perform authentication and verification in real-time by recording authentication information in the blockchain of virtual currency.

The present invention has another effect of improving service speed and reducing the transaction cost by configuring a Merkle tree by using information on the notary service and registering only a root value of the Merkle tree with the blockchain instead of registering all of the information on the notary service with the blockchain.

The present invention has still another effect of providing guaranteed integrity of a database by performing the verification using the Merkle tree generated in response to a verification request for the file.

Meanwhile, the processor 120 may control a data flow among the communication part 110 and the other components. That is, the processor 120 may control the communication part 110 and other components to perform their unique functions, by controlling the data flow among each component within the server 100.

The processor 120 may include hardware configuration of MPU (Micro Processing Unit) or CPU (Central Processing Unit), cache memory, data bus, etc. Additionally, OS and software configuration of applications that achieve specific purposes may be further included.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a compiler but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for providing a notary service for a file, comprising steps of:
   (a) a server, if a notary service request for the file is acquired, generating or supporting another device to generate a specific message digest of the file by using a hash function; and
   (b) the server, if one of anchoring conditions is satisfied, registering or supporting another device to register a representative hash value or its processed value in a database, wherein the representative hash value is generated by using a specific hash value and its corresponding at least one neighboring hash value, and wherein the specific hash value is a hash value of a result acquired by encoding the specific message digest with a private key of a first user, a private key of a second user, and a private key of the server, wherein at the step of (b), the server performs or supports another device to perform (i) a process of generating at least one Merkle tree including a specific leaf node where the specific hash value is allocated, and (ii) a process of registering, if said one of the anchoring conditions is satisfied, the representative hash value or its processed value, which is calculated by using the specific hash value and at least one hash value allocated to at least one of other leaf nodes which have same depth as the specific leaf node in the Merkle tree, in the database.

2. The method of claim 1, wherein the specific hash value is the hash value of the result acquired by encoding a group data with the private key of the server, and wherein the group data is comprised of a first encoded message digest generated by encoding the specific message digest with the private key of the first user, and a second encoded message digest generated by encoding the specific message digest with the private key of the second user.

3. The method of claim 1, wherein the specific hash value is the hash value of the result generated by encoding the specific message digest in sequence with the private key of the first user, the private key of the second user, and the private key of the server.

4. The method of claim 1, wherein, at the step of (b), the anchoring conditions include at least one of (i) acquisition of a certain number of message digests including the specific message digest in response to respective notary service requests, (ii) a certain time lapse, (iii) generation of a block in a blockchain, and (iv) one or more characteristics of a user who requests a notary service.

5. The method of claim 1, wherein, if said one of the anchoring conditions is satisfied,
(x1) the server calculates or supports another device to calculate (i) the specific hash value and (ii) a hash value allocated to a sibling node of the specific leaf node, to thereby acquire a resultant value, and then allocates or supports another device to allocate a hash value of the resultant value to a parent node of the specific leaf node;
(x2) the server, if the parent node is a root node of the Merkle tree, registers or supports another device to register the hash value of the resultant value allocated to the parent node in the database, as the representative hash value; and
(x3) the server, if the parent node is not the root node of the Merkle tree, repeats or supports another device to repeat the steps of (x1) to (x3) by using the hash value of the resultant value allocated to the parent node as the specific hash value.

6. The method of claim 5, wherein, at the step of (x1), if no hash value is allocated to the sibling node of the specific leaf node even though said one of the anchoring conditions is satisfied, the server allocates or supports another device to allocate a certain hash value to the sibling node, and then performs or supports another device to perform the steps of (x1) to (x3).

7. The method of claim 1, wherein, if no notary service request is acquired at the step of (a), and if said one of the anchoring conditions is satisfied at the step of (b), the server performs or supports another device to perform a process of generating a Merkle tree with first and second leaf nodes where certain message data is respectively allocated, and a process of registering a root value or its processed value of the Merkle tree in the database.

8. The method of claim 1, wherein the notary service for the file includes at least one of an authentication service for the file and a revocation service for the file.

9. The method of claim 1, wherein the database is a blockchain of a virtual currency or the database is managed by the server.

10. A server for providing a notary service for a file, comprising:
a communication part for acquiring or supporting another device to acquire a notary service request; and
a processor for (I), if the notary service request for the file is acquired, generating or supporting another device to generate a specific message digest of the file by using a hash function, and (II), if one of anchoring conditions is satisfied, registering or supporting another device to register a representative hash value or its processed value in a database, wherein the representative hash value is generated by using a specific hash value and its corresponding at least one neighboring hash value, and wherein the specific hash value is a hash value of a result acquired by encoding the specific message digest with a private key of a first user, a private key of a second user, and a private key of the server, wherein
the processor performs or supports another device to perform (I) a process of generating at least one Merkle tree including a specific leaf node where the specific hash value is allocated, and (II) a process of registering, if said one of the anchoring conditions is satisfied, the representative hash value or its processed value, which is calculated by using the specific hash value and at least one hash value allocated to at least one of other leaf nodes which have same depth as the specific leaf node in the Merkle tree, in the database.

11. The server of claim 10, wherein the specific hash value is the hash value of the result acquired by encoding a group data with the private key of the server, and wherein the group data is comprised of a first encoded message digest generated by encoding the specific message digest with the private key of the first user, and a second encoded message digest generated by encoding the specific message digest with the private key of the second user.

12. The server of claim 10, wherein the specific hash value is the hash value of the result generated by encoding the specific message digest in sequence with the private key of the first user, the private key of the second user, and the private key of the server.

13. The server of claim 10, wherein the anchoring conditions include at least one of (i) acquisition of a certain number of message digests including the specific message digest in response to respective notary service requests, (ii) a certain time lapse, (iii) generation of a block in a blockchain, and (iv) one or more characteristics of a user who requests a notary service.

* * * * *